United States Patent
Lee et al.

(10) Patent No.: US 8,718,133 B2
(45) Date of Patent: May 6, 2014

(54) METHOD AND SYSTEM FOR IMAGE SCALING DETECTION

(75) Inventors: Sangkeun Lee, Seoul (KR); Yeong-Taeg Kim, Irvine, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 1445 days.

(21) Appl. No.: 12/056,177

(22) Filed: Mar. 26, 2008

(65) Prior Publication Data

US 2009/0245755 A1  Oct. 1, 2009

(51) Int. Cl.
*H04N 11/02* (2006.01)

(52) U.S. Cl.
USPC .................. 375/240.02; 375/240.12

(58) Field of Classification Search
USPC .................. 375/240, 240.01, 240.08, 240.09, 375/240.16
See application file for complete search history.

(56) References Cited

U.S. PATENT DOCUMENTS

| | | | | |
|---|---|---|---|---|
| 5,467,135 | A * | 11/1995 | Yamane et al. | 375/240.16 |
| 6,236,682 | B1 * | 5/2001 | Ota et al. | 375/240.16 |
| 7,753,077 | B2 * | 7/2010 | Bertolasi et al. | 137/636.2 |
| 2004/0036924 | A1 * | 2/2004 | Ihara | 358/3.28 |
| 2004/0156556 | A1 * | 8/2004 | Lopez | 382/276 |
| 2007/0291138 | A1 * | 12/2007 | Cheung et al. | 348/240.2 |

* cited by examiner

*Primary Examiner* — Edan Orgad
*Assistant Examiner* — Curtis A Alia
(74) *Attorney, Agent, or Firm* — IP Investment Law Group (57) ABSTRACT

A method and system for image scaling detection is provided. Image scaling detection involves receiving a decoded scaled input image having a plurality of pixels, wherein the input image has a scaling ratio relative to an original image; detecting blocking boundary artifact pixels in the image; determining a sum of pixel values for each blocking boundary artifact; detecting the pixel distance value between each pair or neighboring block boundaries; and determining the scaling ratio based on a distance value and said sum of pixel values.

8 Claims, 7 Drawing Sheets

FIG. 1

Vertical
Block Boundary

METHOD AND SYSTEM FOR IMAGE SCALING DETECTION

FIELD OF THE INVENTION

The present invention relates generally to image processing, and in particular to image scaling.

BACKGROUND OF THE INVENTION

With the proliferation of video communications, it is becoming increasingly important to improve the quality of images displayed on large display screens at a high resolution. Typically, image/video post-processing functions are implemented to improve and enhance the image/video signals displayed.

Digital video image content is typically encoded by a variety of digital compression techniques such as JPEG and MPEG to meet data bandwidth limitations in communication networks. Compressed digital images contain varying degrees of artifacts that deteriorate the quality of displayed video images and scenes. Such artifacts are referred to herein as "compression noise or blocking artifacts". As such, compression noise reduction is applied in post-processing to reduce noise. Compression noise reduction detects and removes JPEG/MPEG blocking artifacts from the digital videos before displaying on a screen.

In compression noise reduction, a process for removing blocking artifacts is performed by filtering along block boundaries which are caused by data compression, such as MPEG. However, as the size and resolution of the display screens are increasing, such display screens are larger than the original size of image/video signals transferred through a network. As such, the signals transferred are enlarged using a scaling ratio to fit the size of the larger displays. If the scaling ratio is known, a typical blocking artifact reducer may adjust the location of image filtering according to the scaling ratio. However, if the scaling ratio is not known (such as for an outsource input to a television), then such a blocking artifact reducer fails to remove the artifacts effectively.

BRIEF SUMMARY OF THE INVENTION

The present invention provides a method and system for image scaling detection. One embodiment involves receiving a decoded scaled input image comprising a plurality of pixels, wherein the input image has a scaling ratio relative to an original image; detecting blocking boundary artifact pixels in the image; determining a sum of pixel values for each blocking boundary artifact; detecting the pixel distance value between each pair or neighboring block boundaries; and determining said scaling ratio based on a distance value and said sum of pixel values.

Determining the scaling ratio may further include determining pixel position difference values for each pair of neighboring sum of pixel values, determining a peak value among the pixel position difference values, and determining said scaling ratio based on said peak value and said pixel position difference value. The scaling ratio may be determined as a ratio of the said peak value to said pixel position difference value.

These and other features, aspects and advantages of the present invention will become understood with reference to the following description, appended claims and accompanying figures.

DETAILED DESCRIPTION OF THE INVENTION

The present invention provides a method and system for detecting the scaling ratio of scaled (enlarged/reduced) image/video signals for image processing such as enhancement, restoration, compression noise reduction, etc. One embodiment involves detecting a scale ratio of an enlarged digital image relative to an original digital image. The scaling ratio can guide the application of image processing techniques to proper locations in an enlarged (scaled) image.

An implementation of the present invention involves detecting an image scale ratio and applying appropriate image processing to the scaled image based on the detected image ratio. The present invention is also applicable to cases where an image size is reduced (scaled down by a ratio) compared to an original image. Utilizing the scaling ratio may improve the performance of blocking artifact reducers for enhancing the compressed image/video data that is then decompressed and enlarged for display, wherein blocking artifact reduction is applied to the decompressed and enlarged image.

Figure 1:
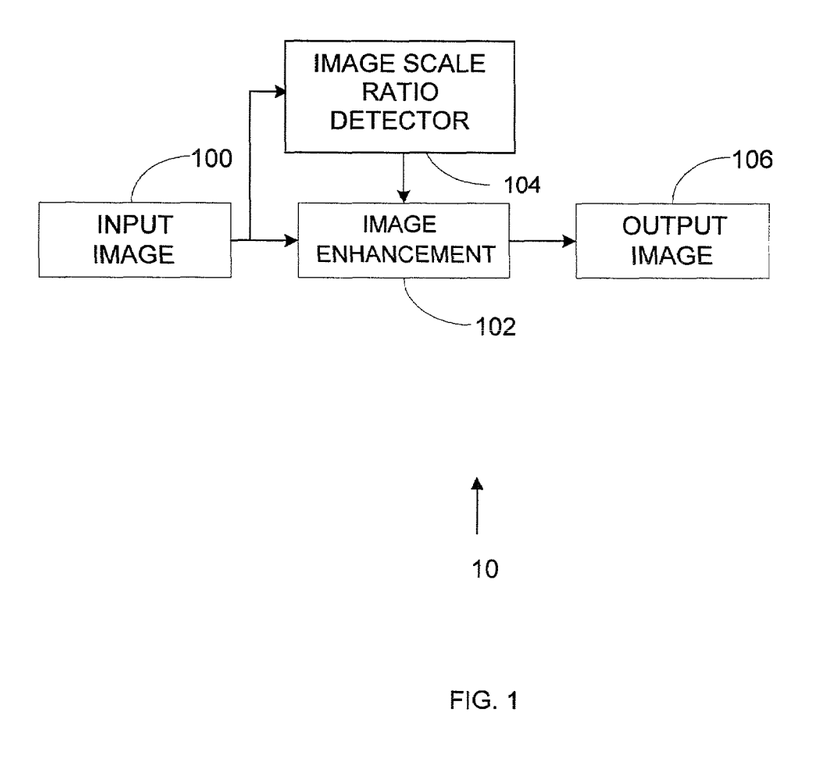
FIG. 1 shows a functional block diagram of an image post-processing system 10 implementing image scaling detection for image enhancement, according to an embodiment of the present invention.

FIG. 1 shows a functional block diagram of an image post-processing system 10 implementing image scaling detection for image enhancement, according to an embodiment of the present invention. The system 10 receives a decompressed (decoded) input image in an input processor 100, and enhances the image in the image enhancer 102 to generate an enhanced output image passed to an output image processor 106. Enhancement in the image enhancer 102 comprises blocking artifact reduction using a scaling ratio determined by an image scale ratio detector 104, according to an embodiment of the present invention.

Figure 2A:
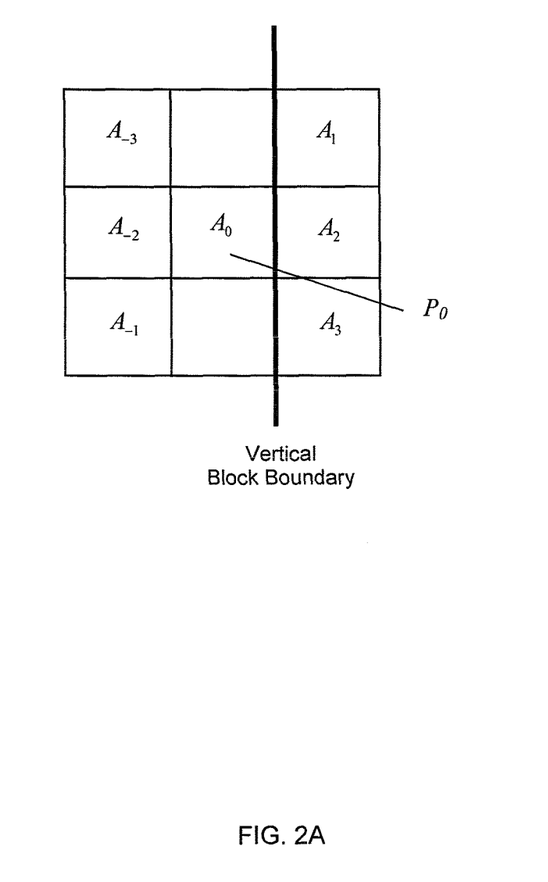
FIGS. 2A-B show horizontal and vertical blocking artifact boundaries, respectively.
Figure 2B:
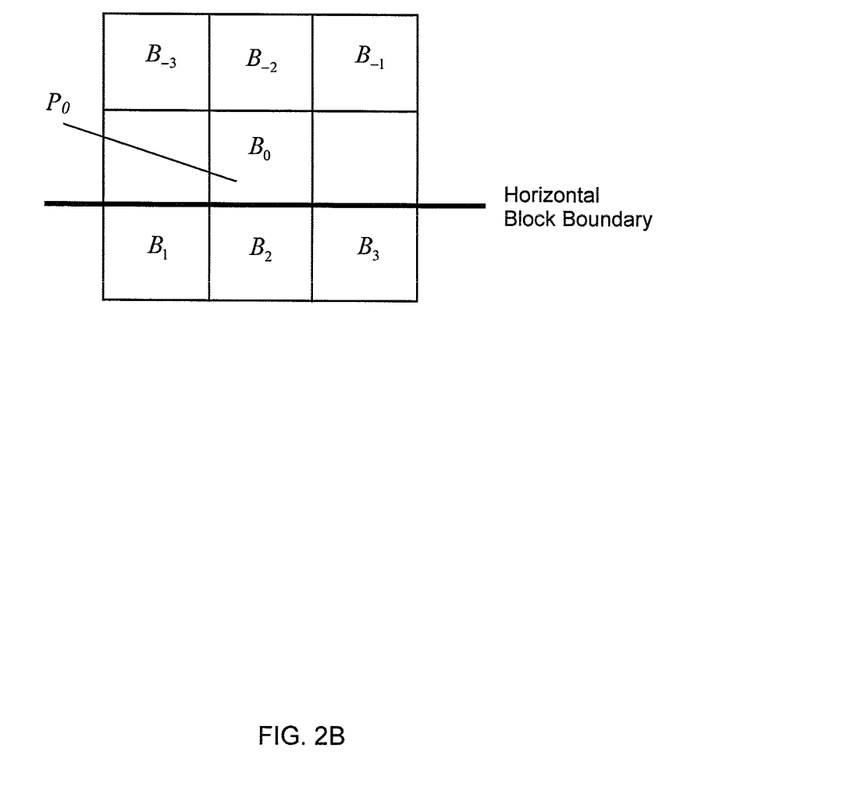
Figure 2C:
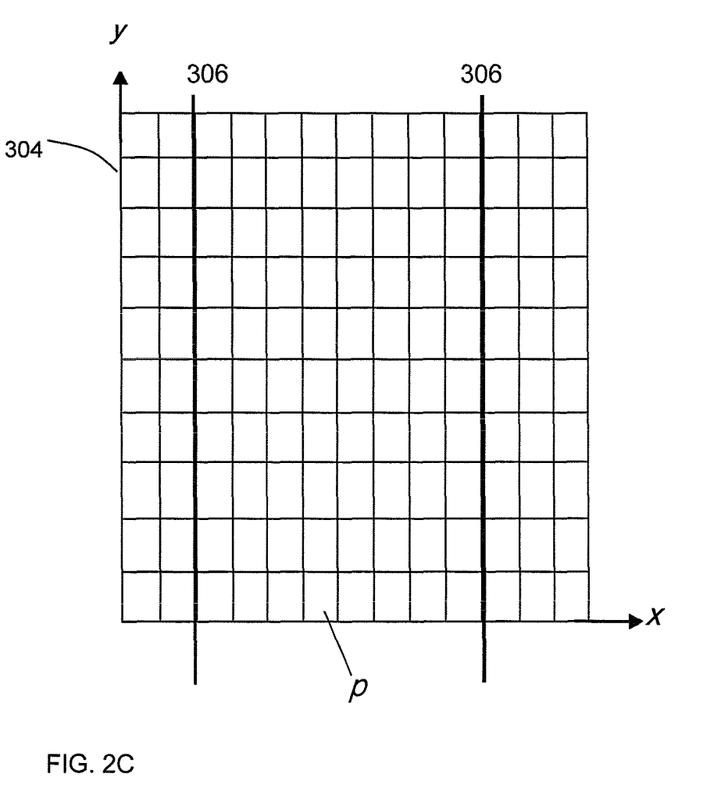
FIGS. 2C-D show vertical block boundaries in an original image and a scaled version of the original image, respectively.
Figure 2D:
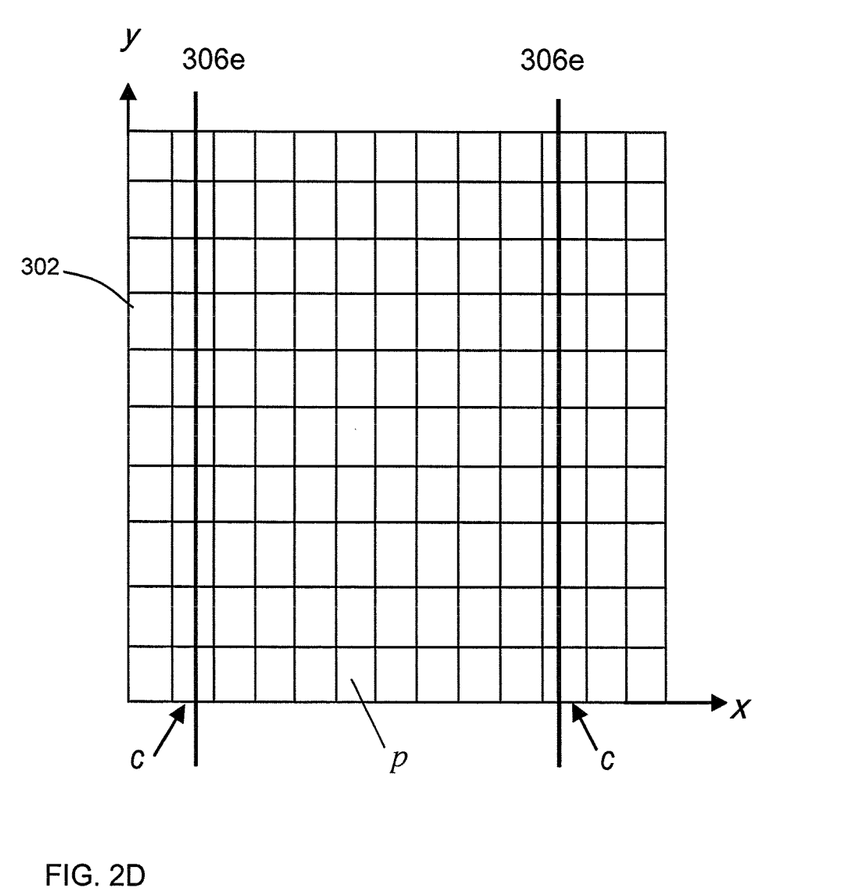

FIGS. 2A-B show horizontal and vertical blocking artifact boundaries, respectively, in an uncompressed enlarged digital image. Specifically, in FIG. 2A a pixel p with the value $A_0$, is a vertical block boundary pixel located at the left side of the vertical block boundary. The values $A_1, A_2, A_3, A_{-1}, A_{-2}$ and $A_{-3}$, are for some of the neighboring pixels of the center pixel. In FIG. 2B, a pixel p with value $B_0$ is a horizontal block boundary pixel, located at the top side of the horizontal block boundary. Values $B_1, B_2, B_3, B_{-1}, B_{-2}$ and $B_{-3}$, are for some of the neighboring pixels of the center pixel. FIG. 2C shows two vertical block boundaries in an original image, and FIG. 2D shows vertical block boundaries of an enlarged version of the original image. The enhancer 102 applies blocking artifact removal at the block boundaries.

Figure 3:
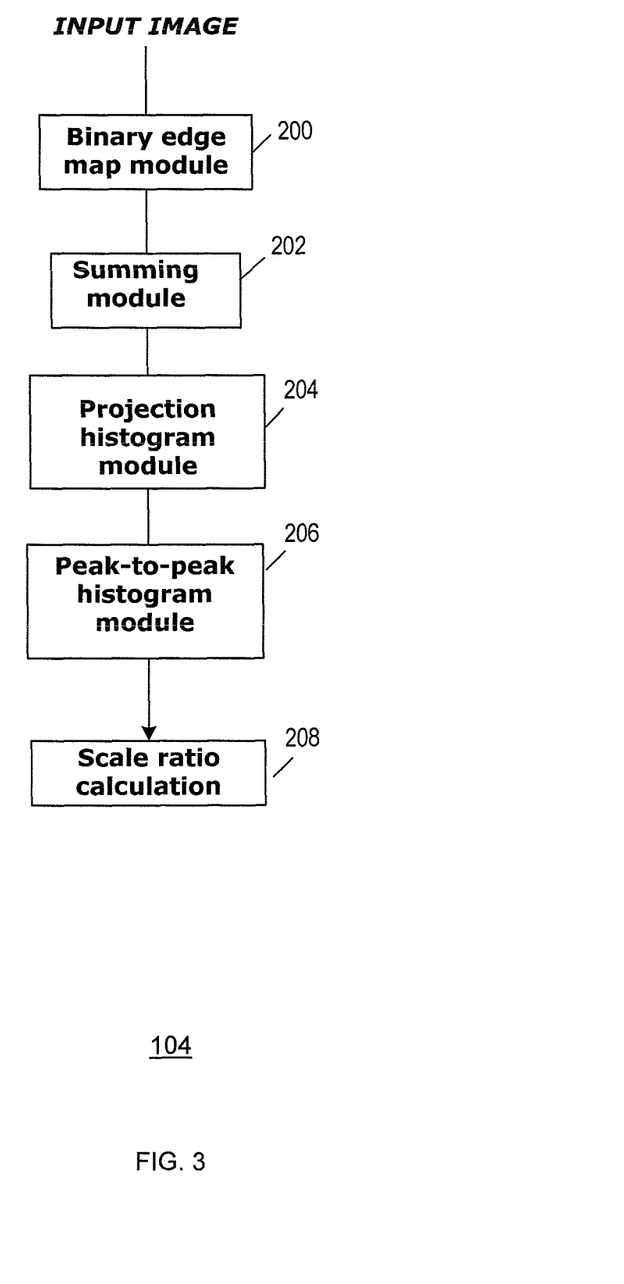
FIG. 3 shows a functional block diagram of an embodiment of the image scale ratio detector, according to the present invention.

FIG. 3 shows a functional block diagram of an embodiment of the image scale ratio detector 104. The ratio detector 104 includes a binary edge mapping module 200, a summing module 202, a projection histogram module 204, a peak-to-peak histogram module 206 and a scale ratio calculation module 208. The ratio detector 104 detects the image scaling ratio of the input image 302 of FIG. 4 based only on the input image 302 received, according to an example process 300 shown in FIG. 4, described below.

Referring back to FIG. 2C, a decoded (decompressed) original image 304 includes vertical blocking boundaries (artifacts) 306 spaced by a number n of pixels p (e.g., spacing of n=8 pixels is shown in FIG. 2C). A decoded (decompressed) input image 302 (FIG. 2D) is a scaled version of the original image 304 by a ratio r (e.g., image 302 is r–1.25 times larger in area than image 304). The image 302 includes vertical blocking boundaries (artifacts) 306e corresponding to the boundaries 306 in the original image 304 (FIG. 2C). The image 302 is shown in decompressed form.

Figure 4:
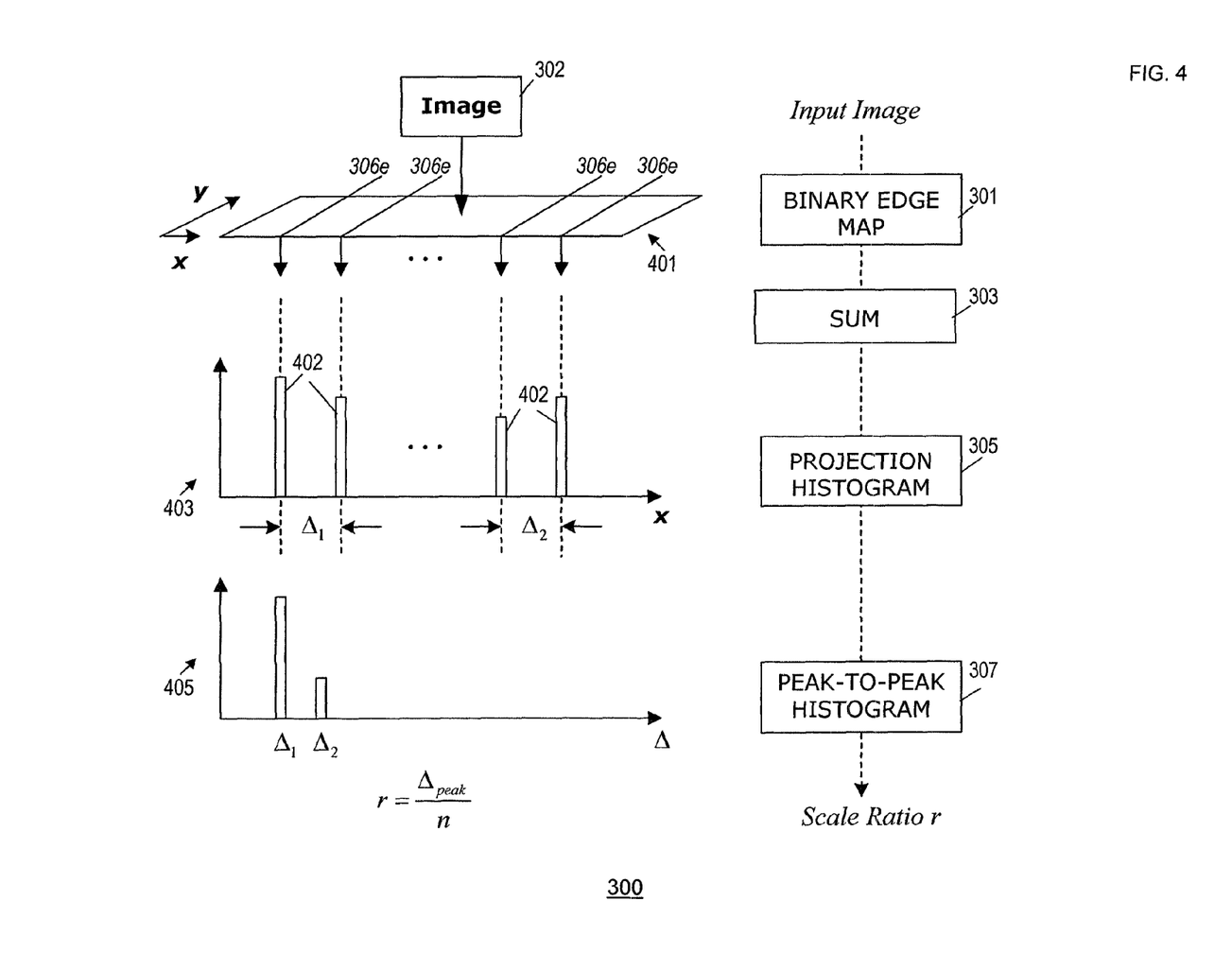
FIG. 4 shows an example of an image scaling ratio detection process, according to the present invention.

Now referring to FIG. 4, in conjunction with FIG. 2D, in this example a horizontal scale ratio (along the x-axis) is determined by detecting the vertical block boundaries 306e in the input image 302. Then, a binary map 401 of blocking boundaries (artifacts) 306e for the decompressed image 302 is obtained (step 301). In one implementation, a strong edge detector function of the module 200 processes an input image signal $Y_{IN}$, wherein the input signal $Y_{IN}$ is low-pass filtered with using a n×m window at each image pixel location (x,y) to generate a filtered signal $Y_L$ as:

$$Y_L(x, y) = \frac{1}{n \times m} \cdot \sum_{i=0}^{n-1} \sum_{j=0}^{m-1} Y_{IN}(x+i, y+j).$$

Next, commonly used four directional Sobel operators are performed on the low-pass filtered image $Y_L(x,y)$ to find image edges $Y_H$ as:

$$Y_H(x, y) = \frac{1}{4} \sum_{k=1}^{4} \sum_{i=-1}^{1} \sum_{j=-1}^{1} \text{abs}(M_k(i,j) \cdot Y_L(x+i, y+j)),$$

wherein, abs(·) indicates an absolute value of (·), $M_k(i,j)$ is the $k^{th}$ Sobel operator according to the relation set below, wherein each Sobel filter is used to obtain edge information:

$$M_1(i,j) = \begin{bmatrix} 1 & 0 & -1 \\ 1 & 0 & -1 \\ 1 & 0 & -1 \end{bmatrix}, \quad M_2(i,j) = \begin{bmatrix} 1 & 1 & 1 \\ 0 & 0 & 0 \\ -1 & -1 & -1 \end{bmatrix},$$

$$M_3(i,j) = \begin{bmatrix} 1 & 1 & 0 \\ 1 & 0 & -1 \\ 0 & -1 & -1 \end{bmatrix}, \text{ and } M_4(i,j) = \begin{bmatrix} 0 & -1 & -1 \\ 1 & 0 & -1 \\ 1 & 1 & 0 \end{bmatrix}.$$

An example of obtaining a binary map then involves obtaining a binary map $Y_B$ for edges/boundaries using a threshold value τ as:

$$Y_B(x, y) = \begin{cases} 1 & \text{if } Y_H(x, y) > \tau \\ 0 & \text{otherwise} \end{cases},$$

wherein $Y_H$ represents a boundary as noted above.

Next, a total sum 402 of occurrences in each image column c containing a boundary 306 is obtained (step 303). The occurrence in each column containing the block edges (where, the binary map indicates the block edges) is summed, on the enlarged image.

Further, the sum 402 of occurrences in each of said columns c is then projected on a histogram 403 after threshold (step 305). The bins of the histogram, larger than a certain amount, are selected. Histogram 403 shows the result of the previous counts of occurrence in each column. The vertical axis of the histogram is the number of pixels belonging to the edge.

Thereafter, from left to right of the histogram 403, the column distance between the peaks in the projection histogram 403 is obtained (i.e., peak-to-peak column distance $\Delta_1$, $\Delta_2$, ...). Once the bins of the histogram greater than a certain amount (threshold) are selected, the distance from a bin to its nearest neighboring bin is peak-to-peak distance.

The peak-to-peak column distance is then projected on a histogram 405 of peak-to-peak column distance Δ (step 307). The vertical axis of histogram 405 is the number of counts that the peak-to-peak value falls on each bin.

Finally, from the histogram 405, the scale ratio r can be determined according to relation (1) below, as:

$$r = \frac{\Delta_{peak}}{n}, \quad (1)$$

wherein $\Delta_{peak}$ is the highest peak in the peak-to-peak distance histogram (i.e., $\Delta_{peak}$=maximum($\Delta_1$, $\Delta_2$, ...)) and n is the number of pixels between the boundaries 306e in FIG. 2D.

Further, a computation may be performed with the following three cases assuming the highest peak is at the location $\Delta_{peak}$. First, when there is no neighboring peak, then the scale ratio r may be determined according to relation (2) below, as:

$$r = \frac{\Delta_{peak}}{n}. \quad (2)$$

Second, when a second highest peak is in the left-hand side of $\Delta_{peak}$, then the scale ratio r may be determined according to relation (3) below, as:

$$t = \frac{f(\Delta_{peak} - 1)}{f(\Delta_{peak})}, \quad (3)$$

$$\Delta'_{peak} = t \times (\Delta_{peak} - 1) + (1 - t) \times \Delta_{peak},$$

$$r = \frac{\Delta'_{peak}}{n},$$

where, f(Δ) is the number/value accumulated in the $\Delta^{th}$ bin of the given histogram.

The second highest peak is smaller than the highest peak. Based on this second highest peak, a more accurate ratio can be calculated statistically.

Third, when the second highest peak is in the right-hand side of $\Delta_{peaks}$ then the scale ratio r may be determined according to relation (4) below, as:

$$t = \frac{f(\Delta_{peak} + 1)}{f(\Delta_{peak})}, \quad (4)$$

$$\Delta'_{peak} = t \times (\Delta_{peak} + 1) + (1 - t) \times \Delta_{peak},$$

$$r = \frac{\Delta'_{peak}}{n}.$$

The scaling ratio r may be used for image prose processing, such as in the image enhancer 102 that performs blocking artifact reduction using a scaling ratio determined by an image scale ratio detector 104, according to an embodiment of the present invention. Utilizing the scaling ratio may improve the performance of blocking artifact reducers for enhancing the compressed image 304 that is then decompressed and enlarged for display, wherein blocking artifact reduction is applied to the decompressed and enlarged image 302 for reducing blocking artifacts before display on a display screen. A similar process can be used for determining a horizontal scale ratio using horizontal block boundaries in the image 302. Further, the vertical scale ratio and the horizontal scale ratio value can be combined to determine an overall scaling ratio for the decoded (uncompressed) enlarged image 302, relative to the original decoded image 304.

The de-blocking process uses a filter for removing artifacts across the boundary. The strength of filtering is adjusted based on the difference across the boundary. Therefore, placing the filter on the correct position is important. In the enlarged image, the blocking boundary is usually changed, and adjusting the filtering location allows proper functioning of the process.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of determining video image scaling in a decoded enlarged image, comprising:
    receiving a decoded scaled input image comprising a plurality of pixels, wherein the input image has a scaling ratio relative to an original image;
    detecting blocking boundary artifact pixels in the input image;
    determining a sum of pixel values on the input image for each blocking boundary artifact;
    detecting the pixel distance value between each pair of neighboring block boundaries; and
    determining said scaling ratio from the input image received based on only said pixel distance value and said sum of pixel values of the input image received.

2. The method of claim 1, wherein the scaling ratio comprises an enlargement ratio.

3. The method of claim 1, wherein the blocking artifact comprises decompressed blocking artifacts.

4. The method of claim 1, wherein determining the scaling ratio further includes determining pixel position difference values for each pair of neighboring sum of pixel values.

5. The method of claim 4, wherein determining the scaling ratio further includes:
    projecting said sum of pixel values on a histogram relative to image pixel positions of the corresponding blocking boundary artifacts; and
    determining pixel position difference values for each pair of neighboring sum of pixel values in the histogram.

6. The method of claim 5, wherein determining said scaling ratio further includes:
    determining a peak value among the pixel position difference values; and
    determining said scaling ratio based on said peak value and said pixel position difference value.

7. The method of claim 6, wherein determining a peak value among the pixel position difference values further includes:
    projecting the pixel position differences values on a histogram; and
    determining said peak value among the pixel position difference values from said histogram.

8. The method of claim 6, wherein determining said scaling ratio includes determining a ratio of the said peak value to said pixel position difference value.

* * * * *